United States Patent
Futschik et al.

[19]

[11] Patent Number: 5,959,364
[45] Date of Patent: Sep. 28, 1999

[54] DISTANCE TRANSMITTING DEVICE MOUNTABLE IN AN INSTRUMENT PANEL AIR-OUTLET SLIT IN A VEHICLE

[75] Inventors: Hans-Dieter Futschik, Gechingen; Norbert Weber, Bondorf, both of Germany

[73] Assignee: DaimlerChrysler AG, Germany

[21] Appl. No.: 08/933,083

[22] Filed: Sep. 18, 1997

[30] Foreign Application Priority Data

Sep. 18, 1996 [DE] Germany .............................. 196 37 994
Jun. 23, 1997 [DE] Germany .............................. 197 26 537

[51] Int. Cl.⁶ ..................................................... B60Q 1/00
[52] U.S. Cl. .......................................... 307/10.1; 340/461
[58] Field of Search ................................... 307/9.1, 10.1; 701/1, 300, 301; 340/933, 903, 901, 461, 462, 980; 359/13; 219/203; 15/250.05; 280/727

[56] References Cited

U.S. PATENT DOCUMENTS

| | | | |
|---|---|---|---|
| 4,983,951 | 1/1991 | Igarashi et al. | 340/461 |
| 5,161,422 | 11/1992 | Suman et al. | 307/10.1 |
| 5,204,666 | 4/1993 | Aoki et al. | 340/980 |
| 5,386,216 | 1/1995 | Iino | 340/980 |
| 5,699,057 | 12/1997 | Ikeda et al. | 340/903 |

FOREIGN PATENT DOCUMENTS

| | | |
|---|---|---|
| 2 026 489 | 6/1971 | Germany . |
| 2 302 684 | 7/1974 | Germany . |
| 88 16 153 | 4/1989 | Germany . |
| 3 802 801 | 8/1989 | Germany . |
| 42 04 495 A1 | 3/1993 | Germany . |
| 42 33 624 A1 | 3/1993 | Germany . |
| 33 39 613 C2 | 5/1993 | Germany . |

*Primary Examiner*—Richard T. Elms
*Attorney, Agent, or Firm*—Evenson, McKeown, Edwards & Lenahan, P.L.L.C.

[57] ABSTRACT

The invention relates to a display arrangement for distance-transmitting device mounted on an instrument panel of a vehicle. The device has at least one display unit on the instrument panel within the field of vision of the driver. The display unit is advantageously inserted into an opening, in particular into a slit-like duct provided or into an extension thereof, in the instrument panel in approximately the vertical direction and to such an extent that a top part of the display unit which contains the display area, projects upwards beyond the instrument panel. The instrument panel has at least one air-outlet slit which extends along the vehicle's windshield, approximately parallel to it and is intended for ventilating the windshield. For the purpose of retrofitting the instrument panel with auxiliary and additional modules for assisting the driver without adversely affecting the aesthetically pleasing appearance of the instrument panel not yet fitted with auxiliary and additional modules, the slit-like duct is introduced into the top side of the instrument panel, in extension of the at least one air-outlet slit, and serves for the purpose of inserting or adding the auxiliary and additional modules.

22 Claims, 3 Drawing Sheets

DISTANCE TRANSMITTING DEVICE MOUNTABLE IN AN INSTRUMENT PANEL AIR-OUTLET SLIT IN A VEHICLE

DISTANCE-TRANSMITTING DEVICE IN A VEHICLE

This application claims the priority of German Application No. 196 37 994.6, filed Sep. 18, 1996, and German Application No. 197 26 537.5, filed Jun. 23, 1997, the disclosures of which are expressly incorporated by reference herein.

BACKGROUND AND SUMMARY OF THE INVENTION

The invention relates to a display arrangement for a distance-transmitting device mounted in an instrument panel of a vehicle within the field of view of a driver of the vehicle, and to an instrument panel (dashboard) configured for such a display.

A vehicle instrument panel usually contains a series of instruments and mechanisms for information purposes, to assist the vehicle driver. Some of these instruments and mechanisms are installed as standard, and others are presented as options which can be chosen when the vehicle is purchased. For installation of the optional additional and auxiliary modules, it is necessary either to provide appropriate openings in the instrument panel, which are covered by closure plates when not used, or to provide fundamentally different designs of instrument panels, with and without installation openings for the optional auxiliary and additional modules. In the first case, when the instrument panel is not equipped with the optional auxiliary and additional modules, the customer often feels that the overall aesthetic impression of the instrument panel is considerably impaired by the dummy closures of the openings provided, especially when production tolerances mean that the closure plate and opening contours are not flush. In the second case, the production and storage costs for the various designs of the instrument panel are considerable.

Distance-transmitting devices of the generic type mentioned above have a plurality of sensors, at least one control mechanism and also at least one display unit which is arranged at a suitable point in the vehicle, as far as possible within the field of vision of the driver. The at least one display unit is arranged on the instrument panel, and is designed as an add-on part which is suitable for this purpose.

In a known distance-transmitting device of this type, a display unit is attached to the front side of the instrument panel, directed towards the vehicle driver, and is secured there by suitable fastening parts. Such a design and fitting methods involve a high degree of outlay, and are cost-intensive in particular.

German patent document DE 20 26 489 A1 discloses an instrument-panel which has the top side oriented towards the windshield of the vehicle, with two air-outlet slits which are spaced apart from one another in the vicinity of the windshield, and are aligned with one another approximately parallel to the windshield. The two air-outlet slits are connected to an air duct, and serve as so-called defroster nozzles for ventilating the wind-shield in order to prevent the latter from misting up with moisture, and to counteract the formation of ice on the windshield in cold weather.

One object of the invention is to provide a distance-transmitting device in a vehicle which is more straightforward and allows a more cost-effective arrangement.

Another object of the invention is to provide an instrument panel of the type mentioned in the introduction, which can be retrofitted with auxiliary and additional modules without difficulty, and which has openings provided for receiving auxiliary and additional modules that do not adversely affect the overall aesthetic impression, either in the presence or in the absence of auxiliary and additional modules.

In a distance-transmitting device of the type mentioned in the introduction, these and other objects and advantages are achieved according to the invention by inserting the display unit in approximately a vertical direction into an elongated or slit-like opening in the instrument panel, with a display area projecting upward beyond the instrument panel. As a result, special add-on parts are not necessary. Moreover, insertion into an opening makes it possible to allow for the manufacturing tolerances, because it is not possible to see where the display unit is positioned in various tolerance ranges. Furthermore, the invention creates the preconditions under which, prior to the insertion of the at least one display unit, the opening provided for this purpose is to be closed off by a removable covering and the latter is only removed if required.

The instrument panel display arrangement according to the invention has the advantage that its visual appearance is not impaired, because the slit-like duct for receiving auxiliary and additional modules, is provided in the form of an extension of the at least one air-outlet slit, which preferably constitutes the defroster nozzle. Since the slit-like duct, in the same way as the air-outlet slit, constitutes a depression, allowances are made for tolerances which arise when the auxiliary and additional modules are inserted. Because the viewer cannot see where the module is positioned in the various tolerance ranges, the quality finish of the instrument panel is enhanced to a considerable extent.

If, on the other hand, the instrument panel is not equipped with the optional modules, then, according to a preferred embodiment of the invention, at least one closure plate is inserted into the slit-like duct. This plate is designed to be releasable, so that if the instrument panel is subsequently retrofitted with at least one of the auxiliary and additional modules, it is easily removable. The positioning of this at least one closure plate in the depth of the slit-like duct in turn ensures both minimal production costs and a high quality finish.

The closure plate, which is located in the depth of the duct outside the field of vision, does not require extremely close tolerances, and may be configured very simply. Therefore, it can be produced in the normal series-production range as an injection moulding coated in standard colour and can be dipped in the depth of the slit-like duct. As a result, the only parts costs for the normal series production of the instrument panel are those for the closure plates.

The instrument panel according to the invention provides the additional advantage that the auxiliary and additional modules can be positioned equally well for right-hand-drive vehicles and left-hand-drive vehicles, without changing the instrument panel.

The accommodation, in the slit-like duct, of the display unit of a distance-transmitting device which functions as a parking aid, and/or of a loudspeaker with a loudspeaker covering, which is used as a so-called "centerfill" has proved particularly advantageous. The loudspeaker in this case is fastened directly beneath the duct, on the duct base, and the loudspeaker covering and the display unit are inserted into the duct from the top side of the instrument panel.

Other objects, advantages and novel features of the present invention will become apparent from the following detailed description of the invention when considered in conjunction with the accompanying drawings.

DETAILED DESCRIPTION OF THE DRAWINGS

Figure 1:
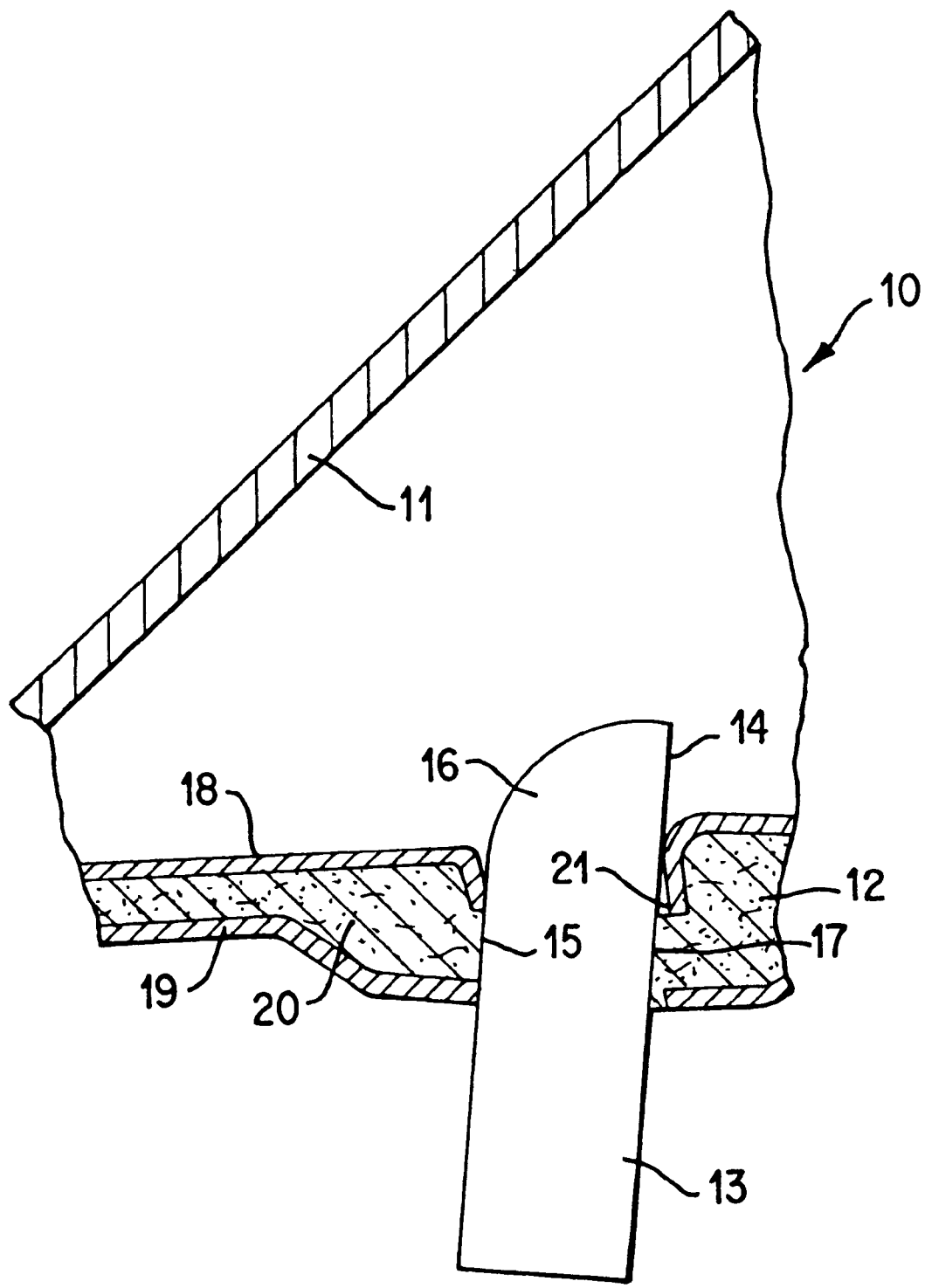
FIG. 1 shows a schematic vertical section through part of an instrument panel and windshield of the vehicle.

Referring to FIG. 1, the vehicle 10, of which only part of the windshield 11 and of the instrument panel 12 are shown schematically, has a distance-transmitting device of a known type, which includes sensors (not shown), at least one control mechanism and also individual display units, of which just one display unit 13 is schematically indicated in the drawing. The at least one display unit 13 is fitted on the instrument panel 12 within the field of vision of the driver, so that the driver has the best possible, unobstructed view of the display area 14 of the display unit 13. It is also possible for a plurality of such display units 13 to be fitted on the instrument panel 12, e.g. a display unit on the side where the driver sits, that is to say on the left-hand side in the case of a left-hand drive vehicle and on the right-hand side in the case of a right-hand-drive vehicle, as well as a display unit approximately in the central region.

The at least one display unit 13 is inserted into an opening 15 of the instrument panel 12, preferably in approximately the vertical direction, and preferably to such an extent that a top part 16, which contains the display area 14, projects upwards beyond the top side of the instrument panel 12.

The opening 15 in the instrument panel 12 is formed by a slit 17, and the display unit 13 fits into and passes through the slit 17. The instrument panel 12 usually comprises a top part 18 and a bottom part 19, spaced apart from the top part so that the space between them may be filled by a filling 20. The slit 17 extends through the top part 18, the filling 20 and the bottom part 19. The opening 15, in particular the slit 17, is formed, at least where the top part 18 is concerned, from a slit-like duct 21 (e.g., a ventilation duct, for example a defroster duct) provided therein.

Prior to the insertion of the at least one display unit 13, the opening 15, in particular at least the top part 18 of the duct 21, can be closed by a removable covering (not shown in FIG. 1). Such covering may be, for example, a dummy cover which is clipped into the duct 21 and is designed in the same colour as the surface of the top part 18. If the vehicle 10 is not equipped with a distance-transmitting device, then the duct 21 in the top part 18 is thus closed by the covering. In such vehicles 10 as are equipped with a distance-transmitting device, the covering is removed, so that the duct 21 is open in this region, and the at least one display unit 13 can be inserted in the manner shown.

Since the duct 21 constitutes a depression in the surface contour of the top part 18, allowances are made for any tolerances which arise there. That is, the vehicle occupants cannot see where the display unit 18 is positioned in the various tolerance ranges. It is also advantageous that there is no need for any special add-on parts to fit the at least one display unit 13. Rather, use is preferably made of a ventilation duct which is provided anyway, or an extension thereof, in order to arrange the at least one display unit 13. This reduces the outlay and the costs to a considerable extent.

Figure 2:
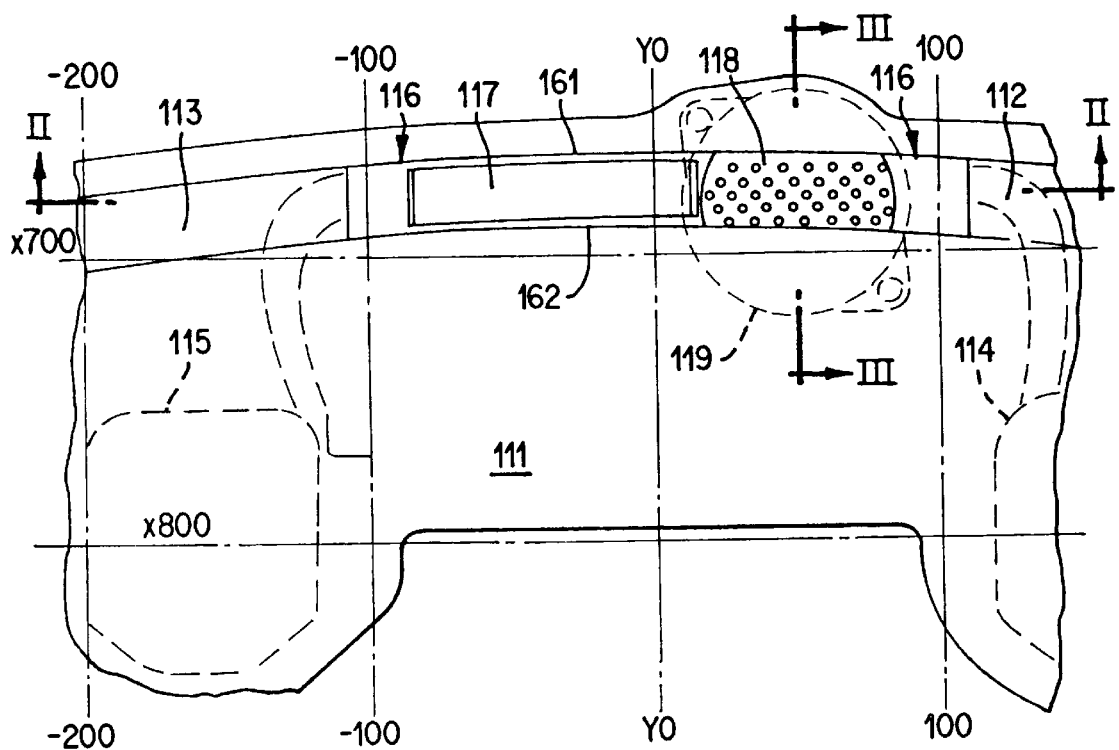
FIG. 2 shows a plan view of a detail of an instrument panel for a passenger vehicle.
Figure 3:
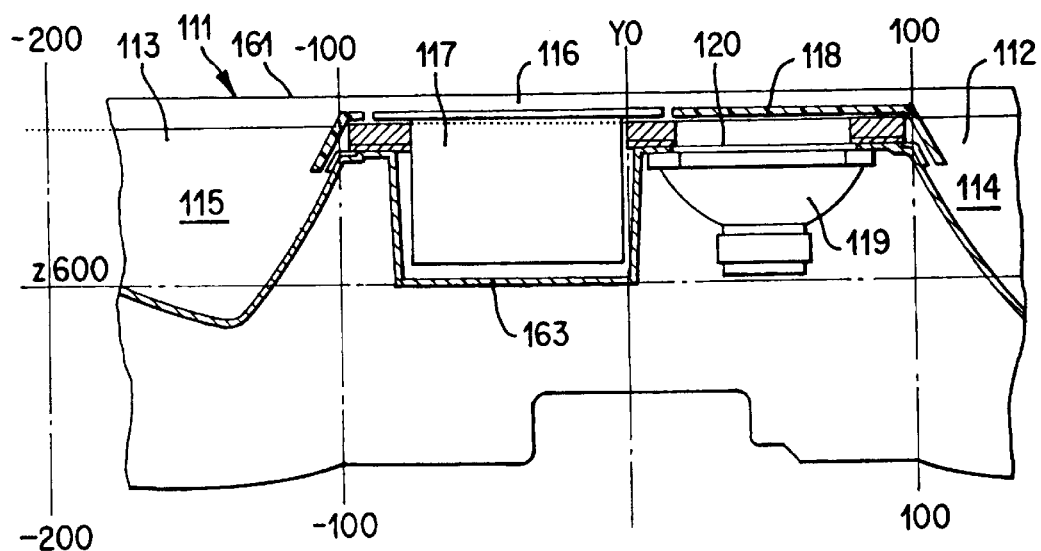
FIG. 3 shows a section along line II—II in FIG. 2.
Figure 4:
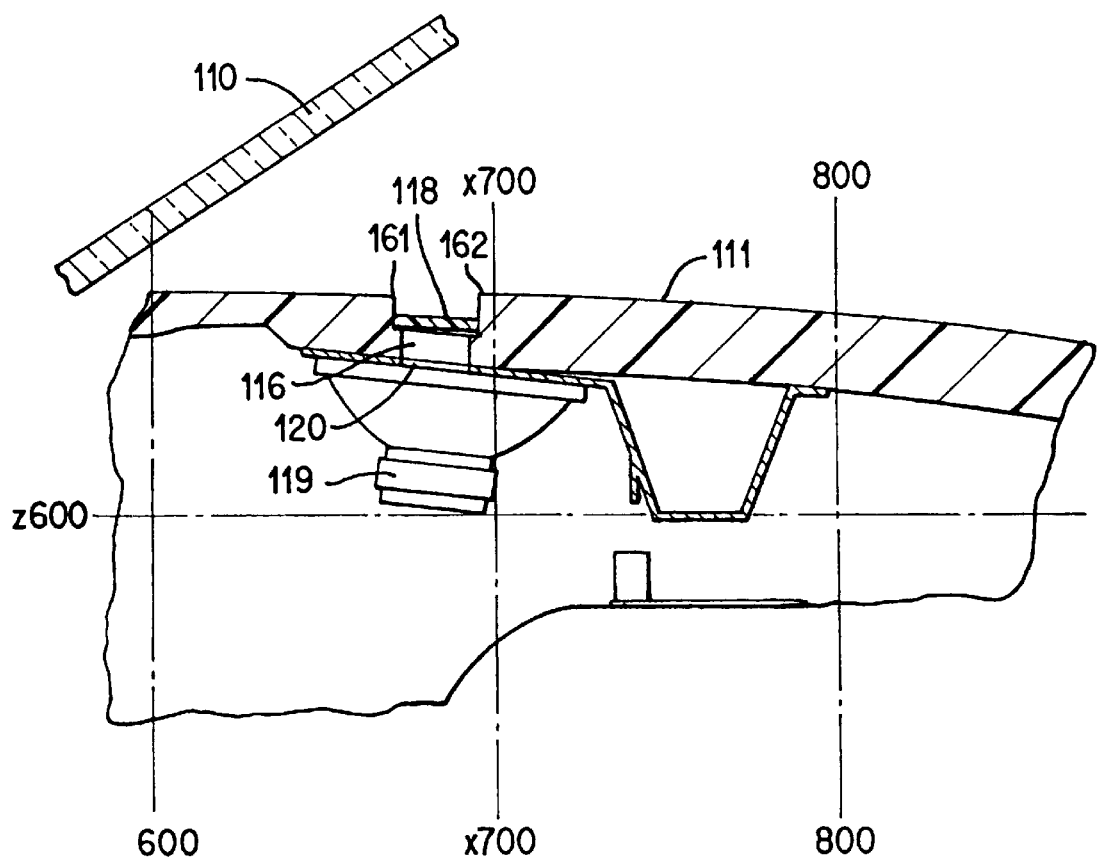
FIG. 4 shows a section along line III—III in FIG. 2.
Figure 5:
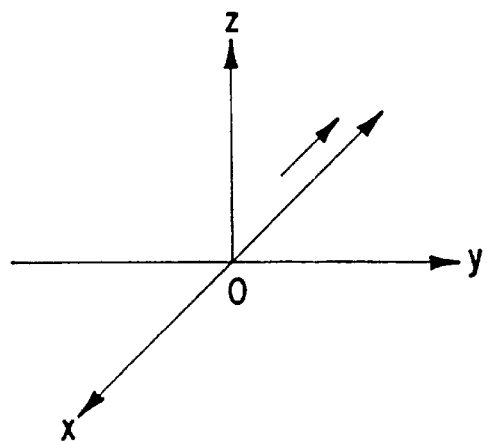
FIG. 5 shows a system of space coordinates for the bodywork of the passenger vehicle in order to illustrate the position of the instrument panel once it has been installed in the vehicle bodywork.

FIG. 2 is a plan view which shows a detail embodiment of an instrument panel having such a ventilation duct, and being configured for a display according to the invention. The instrument panel is installed in the vehicle bodywork of a passenger vehicle along the windshield. (Part of the windshield is illustrated by 110 in FIG. 4.) Subsequent to the installation of the instrument panel in the vehicle bodywork, FIG. 2 illustrates a plan view in the x/y plane, FIG. 3 illustrates a section in the z/y plane, and FIG. 4 illustrates a section in the z/x plane of the vehicle bodywork. (See FIG. 5.) The respective coordinates grid is depicted by chain-dotted lines in FIGS. 2–4.

The instrument-panel top side 111, oriented towards the windshield 110, has arranged in it two air-outlet slits 112, 113 which extend approximately parallel to the windshield 110, run in alignment with one another in the vicinity of the windshield 110 and, as so-called defroster nozzles, are each connected to an air duct 114, 115 which in turn is connected with a ventilation device or heating or air-conditioning system. A slit-like duct 116 runs between the two air-outlet slits 112, 113, in extension of the latter, and can also go beyond the two air-outlets 112, 113. That is to say, it also runs farther outwards on the far side of the two air-outlet slits.

The top edges 161 and 162 of the duct 116 in the top side 111 of the instrument panel are aligned with the longitudinal borders of the air-outlet slits 112, 113, and the duct base 163 connects the two air-outlet slits 112, 113 of the defroster nozzles to one another and/or extends beyond them. If required, this slit-like duct 116 serves for the purpose of inserting or adding auxiliary and additional modules for assisting the driver.

Two such modules are schematically illustrated in the drawing. One module is a display unit 117 of a distance-transmitting device which serves as a parking aid. It executes a distance measurement towards the front and rear during parking in the known manner, and displays the measured distance in the display area of the display unit. The other module is a so-called "centerfill" loudspeaker 119 provided with a loudspeaker covering 118.

The display unit 117 is inserted into the duct 116 from the top side 111 of the instrument panel, for which purpose, in this region, the base 163 of the duct 116 is curved downwards in order to provide a sufficiently large receiving space. In this case, the display unit may be designed such that it projects beyond the top side 111 of the instrument panel and thus protrudes into the field of vision of the driver.

The loudspeaker 119 is attached to the duct base 163 from beneath, the duct base having a cutout 120 in the region of the loudspeaker diaphragm. The loudspeaker covering 118 is inserted into the duct 116 from the top side 111 of the instrument panel such that it fully covers the cutout 120. Both the display unit 117 and the loudspeaker covering 118 are arranged releasably, (preferably clipped) in the depth of the duct 116, at a distance from the top edge 161, 162 of the duct 116. As can be seen from FIGS. 2 and 3, the loudspeaker covering 118 can extend over the entire slit-like duct 116 from the air-outlet slit 112 to the air-outlet slit 113, in which case it has material removed from it in the region of the display unit 117.

If the auxiliary and additional modules 117, 119 are dispensed with, then instead of the loudspeaker covering 118, a closure plate is inserted into the slit-like duct 116, in the same position as the loudspeaker covering 118, (i.e., maintaining a certain distance from the top edges 161, 162 of the duct 116), and is clipped securely in the depth of the slit-like duct 116 using fastening means which are configured in the same way as for the loudspeaker covering 118.

The shape of the closure plate (not illustrated here) corresponds approximately to the shape of the loudspeaker covering 118. Instead of a single closure plate, it is also possible to provide a separate closure plate in each case for the "display unit" duct region and the "loudspeaker" duct region.

The task of fitting the at least one display unit 113 is in the display arrangement according to the invention simplified since all that is required is for the unit to be plugged into the opening 115. It is also advantageous that, in this manner the display unit 113 can be used equally well for both right-hand-drive vehicles and left-hand-drive vehicles, thus obviating the need in each case for appropriately adapted display units 13 of different configurations.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Display arrangement for a vehicle, comprising:
   at least one display unit arranged on an instrument panel of the vehicle within a field of vision of a driver of the vehicle;
   at least one elongated air-outlet opening arranged in a top side of the instrument-panel; and
   an elongated duct arranged in the top side of the instrument panel;
   wherein the at least one display unit is inserted into the elongated duct of the instrument panel, said elongated duct forming an extension of the at least one air-outlet opening.

2. Display arrangement according to claim 1, wherein the at least one display unit is inserted into the elongated duct in approximately a vertical direction.

3. Display arrangement according to claim 1, wherein the at least one display unit is inserted into the elongated duct so that a top part of the display unit containing a display area projects upwards beyond the instrument panel.

4. Display arrangement according to claim 1, wherein the elongated duct in the instrument panel is formed by a channel provided in the instrument panel.

5. Display arrangement according to claim 4, wherein the channel also includes the air-outlet opening.

6. Display arrangement according to claim 1, wherein the elongated duct provided in the instrument panel for the at least one display unit has a removable covering, which can be removed to permit insertion of a display unit.

7. Display arrangement according to claim 6, wherein the elongated duct is contained at least in an upper surface of the instrument panel.

8. Display arrangement according to claim 7, wherein the elongated duct is an extension of a channel provided in the instrument panel.

9. Display arrangement according to claim 8, wherein said channel also includes a ventilation outlet.

10. Instrument panel arrangement for installation in a vehicle, comprising:
    a vehicle instrument panel;
    at least one air-outlet slit which, in an installed position of said instrument panel in a vehicle, is arranged in the instrument-panel top side, oriented towards a windshield of the vehicle and extends approximately parallel to the windshield for ventilating the windshield; and
    a slit-like duct in a top side, of said instrument panel, for receiving auxiliary and additional modules for assisting a driver of said vehicle, said slit-like duct forming an extension of the at least one air-outlet slit.

11. Instrument panel according to claim 10, wherein the slit-like duct extends in alignment with two spaced-apart air-outlet slits, which constitute defroster nozzles arranged in the vicinity of the windshield.

12. Instrument panel according to claim 11, wherein the slit-like duct extends between the two air-outlet slits, and opens into them at its ends.

13. Instrument panel according to claim 11, wherein the slit-like duct continues on both sides beyond the two air-outlet slits.

14. Instrument panel according to claim 10, wherein as an auxiliary or additional module, at least a display unit of a distance-transmitting device is inserted into the silt-like duct.

15. Instrument panel according to claim 14, wherein the distance-transmitting unit is designed as a parking aid with distance measurement towards at least a front and rear.

16. Instrument panel according to claim 14, wherein a display area of the display unit of the distance-transmitting device projects beyond a top side of the instrument panel.

17. Instrument panel according claim 10, wherein
    as an auxiliary or additional module, a loudspeaker is attached to an underside of the slit-like duct, which is provided with a base cutout;
    a loudspeaker covering which spans the base cutout is inserted into the slit-like duct.

18. Instrument panel according to claim 10, wherein in the absence of auxiliary and additional modules, the slit-like duct is covered by at least one releasable closure plate.

19. Instrument panel according to claim 18, wherein the at least one closure plate is arranged releasably in the slit-like duct, at a distance from the top edges of said duct.

20. Instrument panel according to claim 10, wherein fastening means for clip-like fastening of the auxiliary and additional modules and of the at least one closure plate are provided in the duct.

21. A display arrangement for a vehicle, comprising:
    a vehicle instrument panel having a top surface facing substantially upward and a second surface adapted to face substantially toward an operator seat of the vehicle in an installed orientation of the instrument panel;
    at least one elongated air outlet opening in the top surface of the instrument panel; and
    a second elongated opening in the top surface of the instrument panel adapted to receive a display unit to be inserted vertically through said second elongated opening, said second elongated opening being longitudinally aligned with and abutting said elongated air outlet opening to form a substantially continuous feature of said top surface.

22. The display arrangement according to claim 21, wherein said elongated air outlet opening and said second elongated opening are disposed in a channel shaped depression in said top surface of said instrument panel.

* * * * *